United States Patent Office 3,428,939
Patented Feb. 18, 1969

3,428,939
APPARATUS FOR DIGITAL ANALOGOUS CONVERSION, ESPECIALLY FOR THE TIME DEVIATION IN DISTANCE MEASURING DEVICES
Klaus Dieter Witt, Bremen, Germany, assignor to Beteiligungs- und Patentverwaltungsgesellschaft mit beschrankter Haftung, Essen, Germany
Filed Oct. 9, 1967, Ser. No. 673,850
Claims priority, application Germany, Oct. 19, 1966, B 89,439
U.S. Cl. 340—1       8 Claims
Int. Cl. G01s 9/68

ABSTRACT OF THE DISCLOSURE

Distance measuring device employing reflected waves and including variable elements in the circuit for adjusting the device to different distances to be measured. Digital signals representing the desired measuring range and the speed of sound are supplied to a switching arrangement which varies the deflection speed of the beam in a cathode ray tube used to display the echo signals.

---

The present invention relates to a digital analogue conversion for producing a voltage changing linearly with the time and with adjustable digitally insertable changing speed by charging or discharging a capacity, especially for the time deviation of an oscillograph in distance measuring devices operating with sound waves in water in conformity with the reflection method.

It is a well known fact that the voltage changes through a capacity linearly with the time when the capacity is charged or discharged with a constant current. The changing speed of the voltage through the condenser is inversely proportional to the capacity value ($\Delta u/\Delta t = i/C$). By changing the current or the capacity value, the changing speed of the voltage across the capacity can be influenced. Both possibilities are made use of in heretofore known circuits. In these circuits the current or the capacity value are varied by analogous circuit arrangements or mechanical changes.

When employing these heretofore known circuits, it would be necessary first to transform the digital insertion value into an analogous setting value, for instance a voltage, and thereupon it would be necessary by means of said analogous setting value to effect changes in the capacity value or the charging or discharging current. Such circuits require a complicated arrangement and the obtained precision does not satisfy the required interdependence of input and output value of the circuit.

It is, therefore, an object of the present invention to provide a device for digital analogue conversion for purposes of producing a voltage changing linearly with the time with adjustable digitally insertable changing speed, which will overcome the above mentioned drawbacks.

It is another object of the present invention to provide a circuit in which the digital analogue conversion is effected so to speak in one stroke so that a simple circuit and a high accuracy will be realized.

These and other objects and advantages of the invention will appear more clearly from the following specification in connection with the accompanying drawings, in which.

Figure 1:
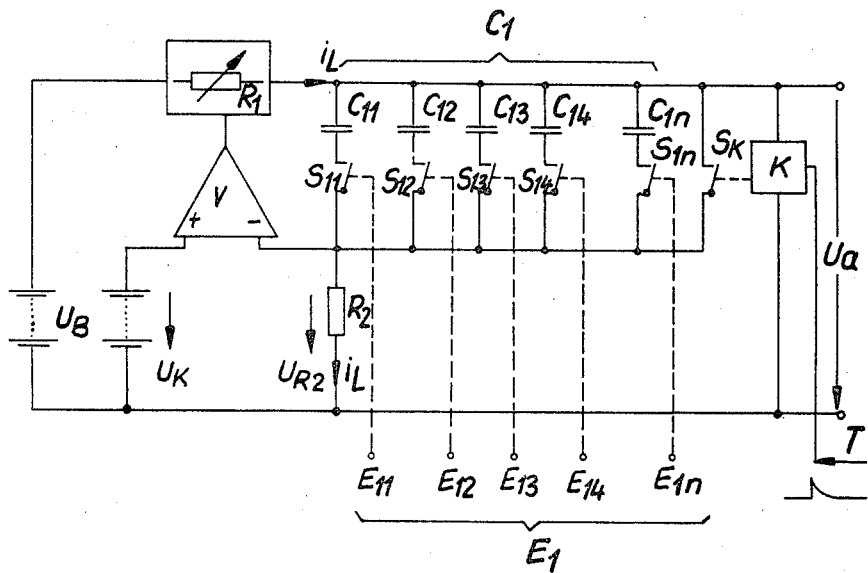
FIG. 1 represent a circuit according to the present invention.

The device according to the present invention is characterized primarily in that the capacity $C_1$ which determines the charging operation comprises a chain of individual capacities $C_{11}, C_{12} \ldots C_{1n}$ which can be arranged in parallel by associated switches $S_{11}, S_{12} \ldots S_{1n}$ of which each one pertains to a digit $E_{11}, E_{12} \ldots E_{1n}$ of a digital input value $E_1$, the capacity values $C_{11}, C_{12} \ldots C_{1n}$ being stepped in conformity with the value of the digits $E_{11}, E_{12} \ldots E_{1n}$ pertaining thereto, and the switches $S_{11}, S_{12} \ldots S_{1n}$ being opened or closed in conformity with the condition O or L of the digitals controlling the same and pertaining to the digital input value $E_1$.

The changing speed of the voltage may, as mentioned above, also be influenced by changing the charging current. This may be effected in conformity with the present invention by composing the loading resistor $R_2$ which determines the charging operation, of a chain of individual resistors $R_{21}, R_{22} \ldots R_{2n}$ which can be arranged in parallel by associated switches $S_{21}, S_{22} \ldots S_{2n}$ of which each one is associated with a digit $E_{21}, E_{22} \ldots E_{2n}$ of a digital input value $E_2$, the conductance of the resistors $R_{21}, R_{22} \ldots R_{2n}$ being stepped in conformity with the value of the digits $E_{21}, E_{22} \ldots E_{2n}$ associated therewith, and the switches $S_{21}, S_{22} \ldots S_{2n}$ being opened or closed in conformity with the condition O or L of the digital controlling the same and pertaining to the digital input value $E_2$.

The sense of the change in the capacity or resistance is to be adapted to the purpose of the respective circuit. The changing speed of the output voltage is either proportional or inversely proportional to the digitally insertable input values. In conformity with a further development of the present invention, also a combination of the two above mentioned devices may be employed in such a way that the changing speed of the voltage is proportional to the quotient of two digitally inserted input values $$(\Delta u/\Delta t \sim E_2/E_1)$$

With distance measuring devices it may, for instance, be desirable that the time passage of the electron ray over the screen of a cathode ray tube, which is determined by the changing speed of the voltage employed for the deviation of time, be made proportional to a preset distance and inversely proportional to a given propagation velocity of the sound waves in water.

The new circuit offers the advantageous possibility of producing digitally other than linear voltage courses by changing the digital input value or values during the charging or discharging of the capacity.

Referring now to the drawings in detail, the illustrated circuit is intended, by way of example, for the time deviation by a saw tooth generator of an oscillograph, used in a distance measuring device operating with underwater sound waves in conformity with the reflection ray method. The time of passage of the electron ray over the screen of the cathode ray tube is intended to be proportional to a digitally introduced input value $E_1$. This input value $E_1$ may correspond to a certain distance, for instance to the distance of an already ascertained reflecting object in the water, when it is intended to bring this object to a certain point of the time deviating scale, or also with the respective maximum distance to be measured.

FIG. 1 illustrates the circuit of a saw tooth generator. The input value $E_1$ is introduced into the circuit with $n$ digits $E_{11}, E_{12} \ldots E_{1n}$. The time determining capacity $C_1$ is formed of a chain $C_{11}, C_{12} \ldots C_{1n}$ in cooperation with switches $S_{11}, S_{12} \ldots S_{1n}$, which operate according to the respective associated digits $E_{11}, E_{12} \ldots E_{1n}$ of the digit input value $E_1$. The charging current $i_L$ flowing into the capacity is furnished by a source $U_B$ of operating voltage and first passes through a controllable resistor $R_1$.

This resistor must be so controlled that the charging current $i_L$ is constant. The control is effected by the output voltage of a differential amplifier V which greatly amplifies the difference between a highly constant source of voltage $U_K$ and the voltage drop $U_{R2}$ of a resistor $R_2$, produced by the charging current $i_L$. Thus a closed control circuit is obtained which maintains the charging current $i_L$ constant. In order to obtain a saw tooth-shaped output voltage $U_a$, it is necessary to close a switch $S_K$ which is open during the charging operation and which discharges the capacity when the starting voltage has reached a certain magnitude. To this end, the switch $S_K$ (for instance a transistor switch) is actuated by a bistable sweep circuit K which then sweeps into a condition corresponding to a closed switch $S_K$ when the output voltage $U_a$ exceeds a set threshold. An opening of the switch $S_K$ and thus a release of a new saw tooth is effected by a trigger impulse T which returns the sweep circuit K to a condition corresponding to the opened switch $S_K$.

The changing speed of the output voltage $U_a$ is proportional to the charging current $i_L$ which in the described circuit is proportional to the conductance of the resistor $R_2$. Thus the changing speed of the output voltage $U_a$ is proportional to $1/R_2 = Y_2$.

Figure 2:
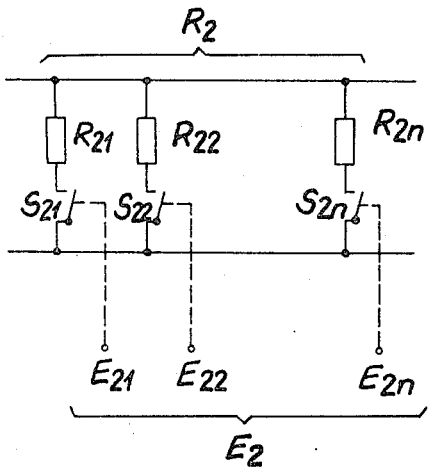
FIG. 2 is a modification of the resistor $R_2$ in the circuit of FIG. 1.

As illustrated in FIG. 2, the resistor $R_2$ may be replaced by a chain of resistors $R_{21}, R_{22} \ldots R_{2n}$ which in a similar manner as the condenser chain can be arranged in parallel by means of switches $S_{21}, S_{22} \ldots S_{2n}$. The switch positions are again assumed to be independent on the digits $E_{21}, E_{22} \ldots E_{2n}$ of a digitally inserted input value $E_2$, and the conductance of the resistors $R_{21}, R_{22} \ldots R_{2n}$ is intended to correspond to the value of the digits $E_{21}, E_{22} \ldots E_{2n}$ associated therewith and pertaining to the input value $E_2$. In this way, a circuit can be realized in which the changing speed of the output voltage is proportional to an inserted digital input value $E_2$.

When chain circuits are employed for $C_1$ as well as for $R_2$, it is possible in the manner of well known digital-analogue-converter realize that the changing speed of the output voltage $U_a$ is proportional to the quotient $E_2/E_1$ of two digitally inserted input values $E_1$ and $E_2$.

Figure 3:
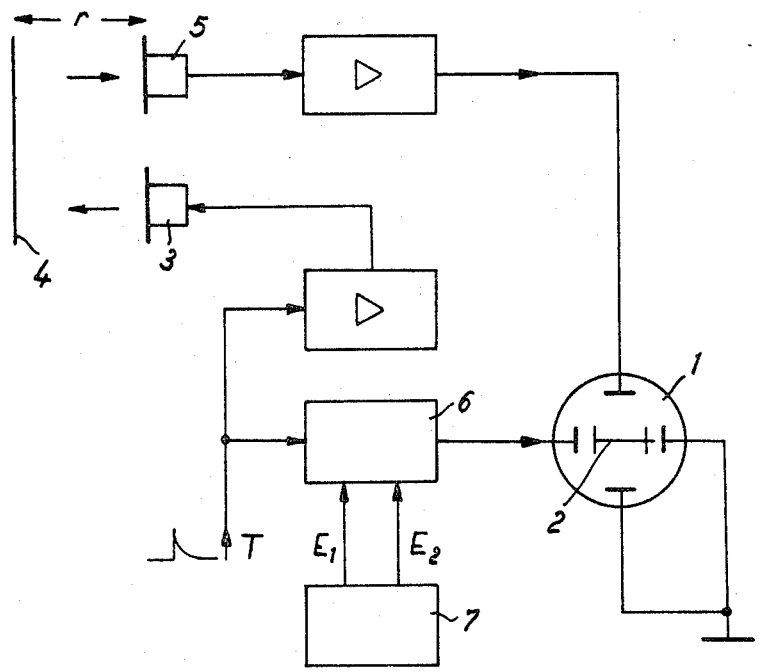
FIG. 3 is a block diagram of a distance measuring device according to the present invention which employs the circuit of FIG. 1 with the modification according to FIG. 2.

As illustrated in FIG. 3, the described saw tooth generator housed in the device 6 may, as mentioned above, be employed for the time deviation of an oscillograph 1 which serves for observing the echos which occur with the reflection of a radiated wave train in a medium, especially water. The time axis 2 of the oscillograph 1 is assumed to be gauged in length units (distance $r$ between emitter 3 and reflecting object 4), and the gauge factor is intended to be variable by an inserted digital input value $E_1$ which may, for instance, correspond to a rated distance. If the propagation velocity of the wave train is not constant in the medium, it is necessary to change the time deviation produced by the device 6 by means of the input value $E_2$. For this purpose there may be empolyed the combination of a condenser chain with a resistor chain. The capacities are controlled by the input value $E_1$ and the resistors corresponding to the inserted distance are controlled by the input value $E_2$ corresponding to the propagation velocity.

In this way a time deviation is obtained in which the time of passage of the ray over the screen of the oscillograph tube is proportional to an inserted distance ($E_1$) and is inversely proportional to an inserted propagation velocity ($E_2$).

The mentioned input values $E_1$ and $E_2$ will be available in digital form, particularly when they are furnished by a digital computer or a data processing system 7. The digital form has the known advantages of high precision and great safety against interference when transmitted over long distances.

It is, of course, to be understood that the present invention is, by no means, limited to the particular arrangements shown in the drawings but also comprises any modifications within the scope of the appended claims.

What is claimed is:

1. In a distance measuring device, an apparatus for digital to analogue conversion for producing a voltage variable linearly with respect to time with adjustable digitally insertable changing speed by charging and discharging a capacity in response to one or two digital input voltages, especially for the time deviation of an oscillograph in distance measuring devices operating with sound waves in the water in conformity with the reflection method, said apparatus having capacitor means and resistance means, a plurality of switches controlling the connection of said resistance means to said capacitor means to control the charging and discharging rate of the capacitor means, each switch pertaining to a different digit and determining a charging rate for the capacitor means corresponding to the value of the respective digit, said switches being opened or closed in conformity with the condition O or I of the respective digits of the digital input value to the apparatus.

2. A device according to claim 1 in which said resistance means is a single resistor and said capacitor means is a plurality of capacitors of different size in parallel and with one of said switches in series with each said capacitor.

3. A device according to claim 1 in which said capacitor means is a single capacitor and said resistance means is a plurality of resistors of different size in parallel and a said switch in series with each resistor.

4. A device according to claim 1 in which said capacitor means is a plurality of capacitors in parallel and said resistance means is a plurality of resistors in parallel and a said switch in series with each capacitor and with each resistor.

5. A device according to claim 1 in which the value of said one or two digital input voltages are adjustable.

6. A device according to claim 5 in which the adjustment of one digital input voltage corresponds to the value of the distance of a previously ascertained reflecting object.

7. A device according to claim 5 in which the adjustment of one digital input voltage corresponds to the value of the maximum ascertainable distance.

8. A device according to claim 1 in which the first digital voltage is adjustable in conformity with a certain distance value and wherein the second digital input voltage is adjustable in conformity with the value of the propagation velocity of the sound waves in the water.

References Cited

UNITED STATES PATENTS

| | | | |
|---|---|---|---|
| 2,757,354 | 7/1956 | Bolzmann | 340—3 |
| 2,810,860 | 10/1917 | Mork | 315—26 K |
| 2,838,752 | 6/1958 | Philpott | 315—26 X |

RICHARD A. FARLEY, *Primary Examiner.*

U.S. Cl. X.R.

315—26; 340—3